(12) United States Patent
Phagoo et al.

(10) Patent No.: US 8,114,293 B2
(45) Date of Patent: Feb. 14, 2012

(54) METHOD OF OPERATING A WATER TREATMENT PLANT WITH IMMERSED MEMBRANES

(75) Inventors: Deonarine Phagoo, Toronto (CA); Douglas Joseph Thompson, Hamilton (CA); Jeffrey Peter Penny, Grimsby (CA); Jake Goldstein, Toronto (CA); Jason A. Diamond, Burlington (CA)

(73) Assignee: Zenon Technology Partnership, Wilmington, DE (US)

( * ) Notice: Subject to any disclaimer, the term of this patent is extended or adjusted under 35 U.S.C. 154(b) by 868 days.

(21) Appl. No.: 11/412,129

(22) Filed: Apr. 27, 2006

(65) Prior Publication Data

US 2006/0266680 A1    Nov. 30, 2006

Related U.S. Application Data

(63) Continuation-in-part of application No. 10/974,886, filed on Oct. 28, 2004, now Pat. No. 7,879,229, which is a continuation-in-part of application No. PCT/CA2004/001897, filed on Oct. 29, 2004.

(60) Provisional application No. 60/514,910, filed on Oct. 29, 2003.

(51) Int. Cl.
*C02F 3/22* (2006.01)
(52) U.S. Cl. .................................. 210/624; 210/790
(58) Field of Classification Search .................. 210/609, 210/621, 624, 768, 650, 805, 806, 779, 790, 210/623
See application file for complete search history.

(56) References Cited

U.S. PATENT DOCUMENTS

| | | | |
|---|---|---|---|
| 4,125,463 A | 11/1978 | Chenoweth | |
| 4,749,494 A | 6/1988 | Tomoyasu et al. | |
| 5,084,220 A | 1/1992 | Moller | |
| 5,248,424 A | 9/1993 | Cote et al. | |
| 5,403,479 A | 4/1995 | Smith et al. | |
| 5,607,593 A | 3/1997 | Cote et al. | |
| 5,620,605 A | 4/1997 | Moller | |
| 5,639,373 A | 6/1997 | Mahendran et al. | |
| 5,643,455 A | 7/1997 | Kopp et al. | |
| 5,783,083 A | 7/1998 | Henshaw et al. | |
| 6,045,698 A | 4/2000 | Cote et al. | |
| 6,214,231 B1 | 4/2001 | Cote et al. | |
| 6,331,251 B1 | 12/2001 | Del Vecchio et al. | |
| 6,517,723 B1 * | 2/2003 | Daigger et al. | 210/605 |
| 6,627,082 B2 | 9/2003 | Del Vecchio et al. | |

(Continued)

FOREIGN PATENT DOCUMENTS

CA        2281889        9/1998

(Continued)

OTHER PUBLICATIONS

English Translation of JP 2001-170670, Jun. 2001.*

(Continued)

*Primary Examiner* — Terry Cecil
(74) *Attorney, Agent, or Firm* — Scott Pundsack; Borden Ladner Gervais LLP

(57) ABSTRACT

A liquid treatment plant has sets of membrane trains and processing trains with flow between them through channels. Steps of withdrawing permeate and sludge from the trains are described. Cyclic aeration is provided to the membrane trains. Methods of foam control, backwashing and chemical cleaning are described. Single membrane trains or process trains may be isolated for various functions. An isolated membrane train may be used to thicken sludge.

5 Claims, 6 Drawing Sheets

U.S. PATENT DOCUMENTS

| | | |
|---|---|---|
| 6,858,140 B2 * | 2/2005 | Smith et al. .................. 210/332 |
| 2006/0163139 A1 * | 7/2006 | Janson et al. .............. 210/321.6 |

FOREIGN PATENT DOCUMENTS

| | | |
|---|---|---|
| CA | 2279766 | 1/2001 |
| JP | 02-095497 | 4/1990 |
| JP | 03-077699 | 4/1991 |
| JP | 03-101815 | 4/1991 |
| JP | 03-249999 | 11/1991 |
| JP | 06-114400 | 4/1994 |
| JP | 06-179000 | 6/1994 |
| JP | 10-028999 | 2/1998 |
| JP | 10-290984 | 11/1998 |
| JP | 11-165200 | 6/1999 |
| JP | 2001170670 A * | 6/2001 |

OTHER PUBLICATIONS

Excerpts from bid documents for the Traverse City WWTP, Mar. 2002.

* cited by examiner

METHOD OF OPERATING A WATER TREATMENT PLANT WITH IMMERSED MEMBRANES

CROSS REFERENCE TO RELATED APPLICATIONS

This is a continuation-in-part of U.S. Ser. No. 10/974,886, filed Oct. 28, 2004 and issued as U.S. Pat. No. 7,879,229 on Feb. 1, 2011, which is an application claiming the benefit under 35 USC 119(e) of U.S. Application Ser. No. 60/514,910, filed Oct. 29, 2003 and this application is a continuation-in-part of International Application Serial No. PCT/CA2004/001897 filed Oct. 29, 2004. All of the applications listed above, are incorporated herein, in their entirety, by this reference to them.

FIELD OF THE INVENTION

This invention relates to an apparatus and process for treating, for example filtering, liquids such as water, which may be wastewater, in a plant having immersed membranes.

BACKGROUND OF THE INVENTION

The description of apparatus elements or process steps in this background of the invention is not an admission that any of the elements or steps are citable prior art of part of the common or general knowledge of a person skilled in the art in any country.

Immersed membranes are a class of filtering membranes. The membranes may have pores in the microfiltration or ultrafiltration range. Individual membranes may be assembled into modules that provide a port or fitting for making connections, for example to withdraw permeate, to one or more membranes. The modules may be assembled into cassettes. The cassette may provide a frame to hold several modules together at a desired spacing or orientation between them. The frame may also support one or more headers or manifolds, for example a permeate manifold for connecting a permeate port for each module to a common permeate port for the cassette. The cassettes may be immersed in tanks filled with water to be treated at ambient pressure and connected to a source of suction for withdrawing permeate through the membrane walls. One or more cassettes may be grouped together into larger production units that may be called trains. Multiple trains of cassettes may be located in a set of distinct tanks. The arrangement of the cassettes, trains and other components of the plant, the configuration of pipe, valve and pump networks for permeation and other functions, and the process steps for operating the plant can each have significant effects on the overall efficiency of the plant, its tolerance of equipment failures or its ease of operation.

U.S. Pat. No. 6,214,231, issued Apr. 10, 2001 to Cote et al., described a plant in which plural cassettes are grouped together for operation in parallel. One or more of the cassettes may be isolated while permeate production from the remaining cassettes is uninterrupted. Ancillary functions such as backpulsing, chemical cleaning and integrity testing may proceed in the isolated cassette or cassettes while permeation continues with the other cassettes. U.S. Pat. No. 6,214,231 is incorporated herein in its entirety by this reference to it.

SUMMARY OF THE INVENTION

It is an object of the invention to improve on, or at least provide a useful alternative to, the prior art. Another object of the present invention is to provide an apparatus or process for treating water, for example wastewater or water intended for drinking, industrial processes, municipal supply, surface discharge or re-use. The apparatus may include multiple cassettes of filtering membranes immersed in one or more tanks containing water at ambient pressure. The process may involve applying suction to these membranes to withdraw permeate and may also involve various ancillary functions. The following description is intended to introduce the reader to the invention, which may reside in a combination or sub-combination of features or steps described below or in other parts of this document, for example the claims.

In one aspect, the invention provides a treatment plant having two or more trains of cassettes, which may be called membrane trains, separation trains or filtration trains. Trains may be located in separate tanks, which may be separate portions of a larger tank. The tanks are each joined to a common inlet channel and a common outlet channel. Individual tanks may be hydraulically isolated from the inlet and outlet channels, for example to perform an ancillary function such as cleaning or tank draining.

In another aspect, the invention provides a treatment plant having two or more hydraulically distinct processing trains in distinct processing tanks, which may be portions of a larger tank. For example, in a wastewater treatment plant, each processing train may have an anoxic reactor connected in series with an aerobic reactor although other sequences of reactors may also be used. The processing tanks are each joined to a common inlet channel and a common outlet channel. In an embodiment, the outlet channel for the processing tanks is also the inlet channel for the membrane tanks. In another embodiment, the outlet channel for the processing tanks is distinct from, but hydraulically connected to, the inlet channel for the membrane tanks. The connection may be made through a pump, such as a recirculation pump, and the water level in the outlet channel for the processing tanks may be lower than the water level in the inlet channel for the membrane tanks. The outlet channel for the membrane tanks may be connected to the inlet channel of the processing tanks with flow by gravity or by recirculation pump. Sets of parallel recirculation pumps, one of which may be a spare, may be used in place of a single recirculation pump.

In another aspect, the invention provides two or more membrane tanks. Each tank having a set of cassettes and is connected to one or more outlet channels that may be a common outlet channel. The connections between the tanks and the outlet channel are made through a weir, or other height controlling mechanism, associated with each membrane tank. The weirs are set at a common elevation so as to maintain a generally common level of water across all membrane tanks. In another aspect, aerators in different membrane tanks, as described in this paragraph, may be connected to a common air supply manifold. In another aspect, membranes in different membrane tanks, as described in this paragraph, may be connected to a common permeate pipe.

In another aspect, the invention provides means or processes for collecting foam from the water surface of a plant. Foam sumps are provided in communication with tanks or channels with foam via an opening at water level in the foam sump. The opening may be a weir or gate that permits the foam to flow into the foam sump while not allowing excessive amounts of liquid into the foam sump. For tanks or channels of water with variable water levels, the opening may be a variable position gate connected to a water level sensor so that the elevation of the gate varies in response to the level of the liquid at the inlet of the foam sump. To reduce the number of foam sumps required, a foam sump may be placed in an outlet channel, for example an outlet channel for the processing tanks. Further, connections between upstream and downstream tanks may be made through gates or weirs that permit foam to pass. Alternately, a connection between tanks in series may be closed from time to time to cause foam to overflow a partition between adjacent tanks or zones. Foam may also be made or encouraged to flow between adjacent tanks in different parallel trains by lowering a gate or weir between the parallel trains from time to time or by causing foam to overflow a partition between the parallel trains. Flow of foam between tanks, particularly adjacent tanks in parallel trains, may be enhanced by temporarily stopping aeration in the tank intended to receive foam.

In another aspect, the invention provides a connection for multiple membrane trains or sets of cassettes to a common source of suction for permeation. The cassettes of each train have their permeate ports connected to a common train header. The train headers are in turn connected to a common plant permeate pipe. The plant permeate pipe is connected to a plurality of parallel permeate pumps. One or more of the permeate pumps may be a spare. Isolation valves may be provided between membrane trains and the plant permeate pipe. The rate of production of permeate may be controlled by turning one or more of the pumps on or off or isolating or connecting one or more trains of membranes, for example, by closing a valve in a train header or by throttling one or more valves in one or more train headers. Individual membrane train flows can be controlled by using a throttling valve as appropriate between one membrane train and the plant permeate pipe. In another aspect, connections for backwashing with permeate, or chemical cleaning by backwashing with a cleaning chemical, may be similarly made to plant pipes serving multiple membrane train headers.

In another aspect, the invention provides for permeation and backwashing to multiple sets of cassettes. The one or more cassettes in each set have their permeate ports connected to a reversible pump which is in turn connected to a pipe common to all of the sets. The pipe is connected to parts of a permeate collection system such as a permeate tank, collection header or channel adapted to maintain a volume of permeate. The permeate pump or other controls maintain a sufficient volume of water in the permeate collection system, preferably at a pressure above the static head in the common pipe, such that the common pipe is always flooded. By choosing the direction of a reversible pump, a set of cassettes may be backwashed while the other sets of cassettes are used for permeate production. Permeate for the backwash is drawn from the permeate collection system. The volume of the common pipe may be taken into account to reduce the size of, or eliminate, the permeate tank, collection header or channel or other parts of the permeate collection system.

In another aspect, aerators are provided for each cassette. The aerators for a cassette are grouped into two groups, each group being connected to a common aerator fitting or connection such that each cassette has two aerator fittings. A pair of air supply manifolds are provided to a set of cassettes. The two aerator fittings for each cassette are connected to the air supply manifold, each fitting to one of the air supply manifolds. Each fitting may have an isolation valve. Each of the pair of manifolds is connected through a valve to a supply of air, the valves in each manifold together forming a valve set. The valve set may be operated to provide a flow of air that cycles between the manifolds. Multiple sets of cassettes may be connected, each through a valve of the valve set, to a common pipe leading to a supply of air. The supply of air may comprise a plurality of blowers, each connected in parallel to the common pipe, one of which may be a spare. In another aspect, air may be provided at a higher flow rate to one of between 3 and 6 sets of aerators associated with a membrane train or a half of a membrane train in sequence in a repeated cycle of 120 seconds or less in duration.

In another aspect, a plurality of membrane trains may be arranged throughout a plurality of distinct membrane tanks. Each distinct tank may be connected through a valve to a common tank drain, manifold, pipe or channel. The common tank drain, manifold, pipe or channel may flow by gravity to a tank or may be connected to one or more tank drain pumps, which may be a set of parallel drain pumps, possibly including a spare. The tank drain pump or pumps may be connected to pipes or valves to allow drained water, chemical solutions, mixed liquor or sludge to be sent to a storage tank, one or more of the processing trains, to a sludge thickener or digester, or to one or more of the filtration trains. In other aspects, these means may be used to recycle a chemical cleaning solution between membrane tanks, optionally through a chemical tank, and further optionally with addition of chemicals during or after a transfer of the cleaning chemical.

In another aspect, on a continuous or intermittent basis, such as during a period of low flow, one or more of the trains may be operated as a sludge thickener. In an embodiment, outlets from the sludge thickening train are closed for a period of time while the sludge thickening train is operated in a dead end mode. In the dead end mode, the sludge thickening train withdraws permeate from mixed liquor from upstream processing trains or sludge or mixed liquor recirculated or drained from other filtration trains. After or as the level of water in the tank holding the thickening membranes drops, more mixed liquor or sludge is provided either in batches or continuously until the concentration of solids in the sludge thickening tank is increased. The thickened sludge is then discharged and the sludge thickening train either returned to regular service or used to thicken more sludge. The sludge thickening train may also thicken sludge in a continuous process or other optional sludge thickening processes may be used. A single filtration train can be dedicated as the sludge thickener, in either continuous or intermittent operation, or the thickening duty may be rotated through some or all of the membrane tanks One or more of these aspects described above may be combined with each other or with one or more features or steps described below.

BRIEF DESCRIPTION OF THE DRAWINGS

Various embodiments of the invention will now be described with reference to the following figures.

DETAILED DESCRIPTION OF THE INVENTION

Figure 1:
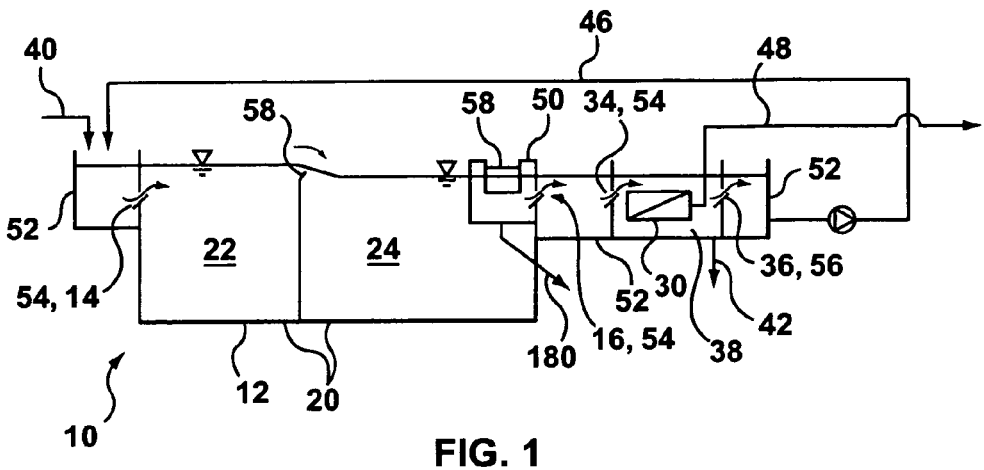
FIG. 1 is a schematic representation, in cross-sectional elevation view, of a treatment plant.

FIGS. 1 to 6 show three embodiments of water treatment plants 10. The treatment plants 10 are intended for treating wastewater, but aspects of their design may also be used in other plants, for example filtration plants for producing water intended for drinking, industrial processes or groundwater recharge. In such other plants, some terms, such as mixed liquor or sludge, used in describing the three embodiments may not be appropriate and should be read with necessary modifications to fit the type of plant. The treatment plants 10 have a plurality of processing trains 12, each occupying a processing tank 20 having a processing tank inlet 14 and processing tank outlet 16. Processing tank partitions 18 separate the processing trains 12 so that they occupy separate processing tanks 20, which may be portions of a larger tank. The processing tanks 20 include anoxic zones 22 and aerobic zones 24. The zones 22, 24 are separated from each other by partitions and may be referred to as tanks. Further, the zones 22, 24 may be located in physically distinct series connected tanks which may still be considered collectively as a processing tank 20. Alternately, other types or sequences of zones may be provided. For example, in plants 10 for producing potable water, municipal or industrial water supplies, tertiary filtration for ground water recharge or other similar applications, the processing tanks 20 may be used for one or more of flocculation, coagulation, oxidation, pH adjustment, mixing with additives, or other processes in one or more zones or tanks. The treatment plants 10 also include a plurality of membrane trains 30 in membrane tanks 38 separated from each other by membrane tank partitions 32 between membrane tank inlets 34 and membrane tank outlets 36. In this way, the membrane trains 30 occupy distinct membrane train tanks 38. In the embodiments illustrated each membrane tank 38 is a portion of a larger tank and a single membrane train 30 occupies each membrane tank 38. However, a membrane tank 38 may also hold two or more membrane trains 30. Multiple membrane trains 30 in a membrane tank 38 may have independent pipes, valves or other equipment for one or more of permeation, backwashing, maintenance cleaning or aeration. Alternately, multiple membrane trains 30 in a membrane tank 38 may have the pipes, valves or other equipment for these functions linked together such that the multiple membrane trains 30 operate as a larger composite membrane train 30.

Figure 3:
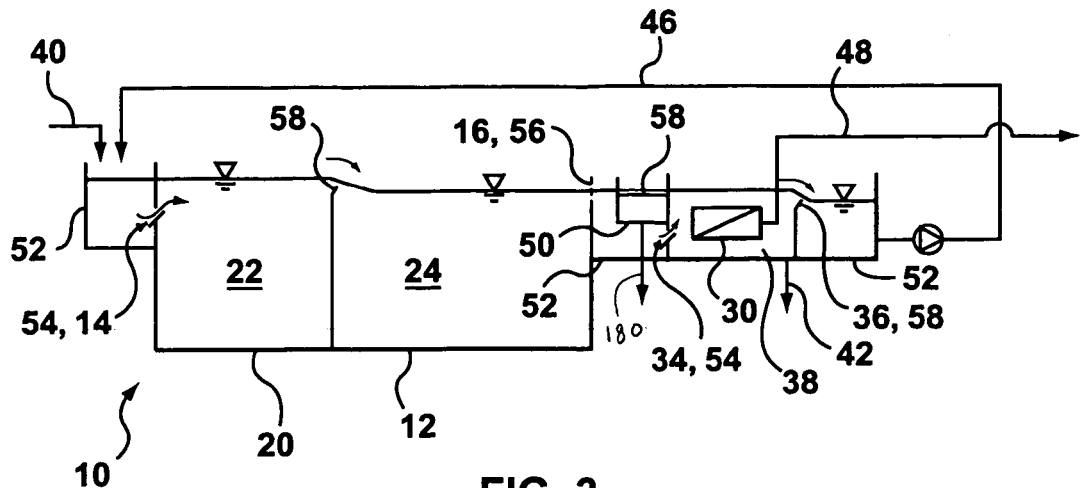
FIG. 3 is a cross-sectional elevation view schematic of another treatment plant.
Figure 5:
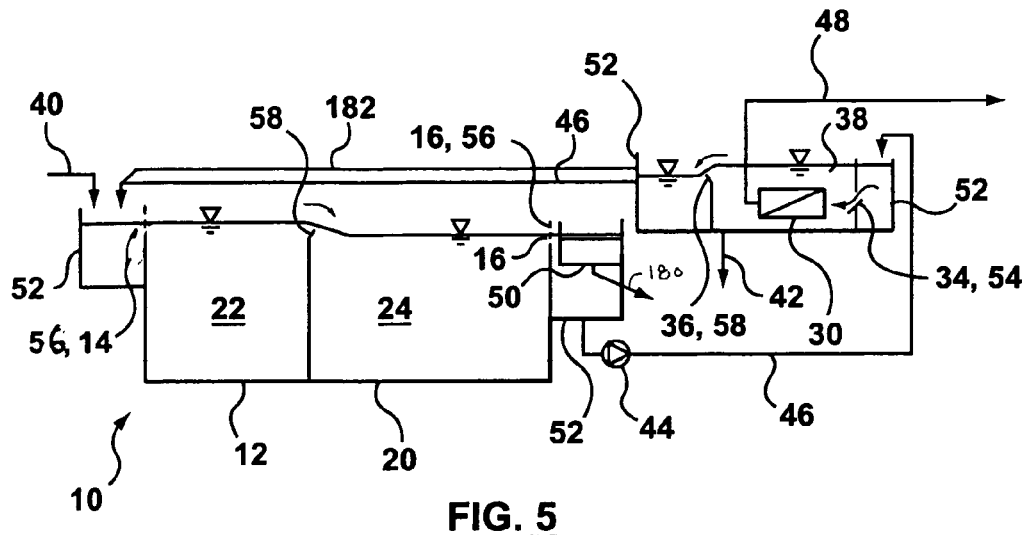
FIG. 5 is a cross-sectional elevation view schematic of another treatment plant.
Figure 6:
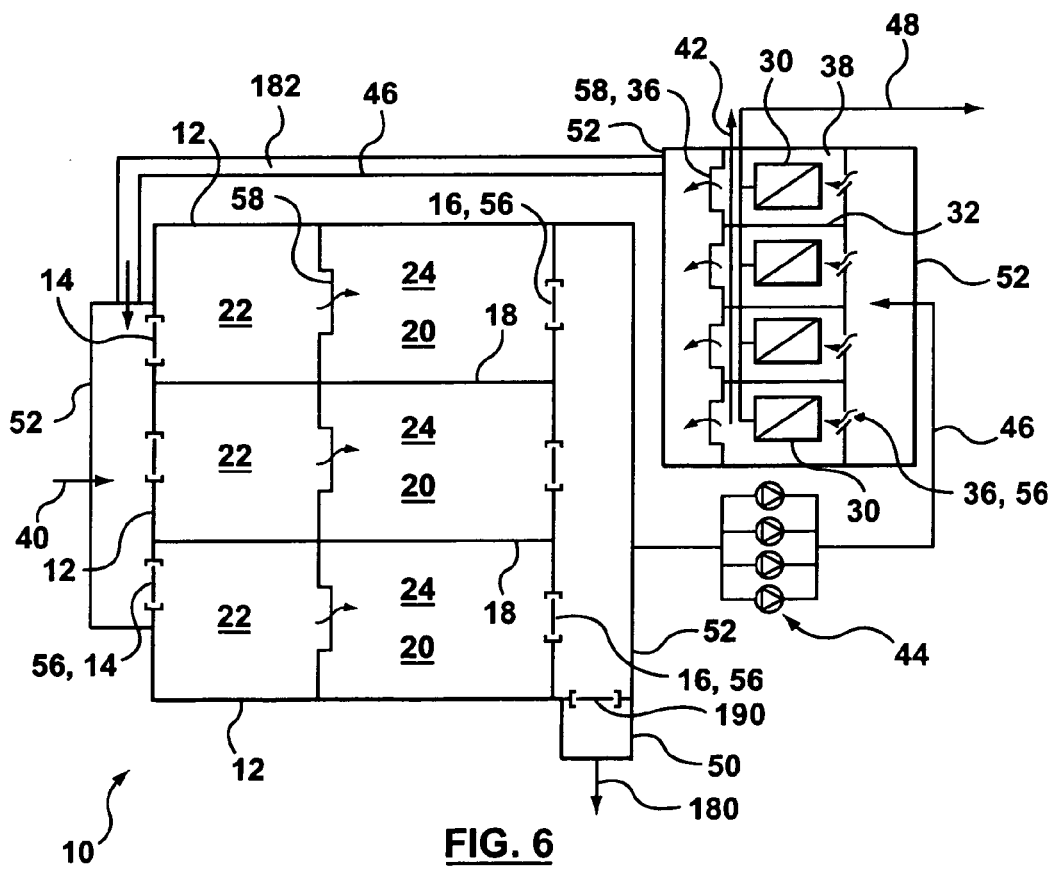
FIG. 6 is a flow schematic of the plant of FIG. 5.

Feed water enters the treatment plants 10 through a feed inlet 40. Waste sludge exits the treatment plants 10 through a sludge drain 42. A circulation pump 44 circulates mixed liquor through the treatment plants 10. In some places mixed liquor recirculates through recycle conduits 46, which may be an open channel 182 as in the embodiment of FIGS. 5 and 6. The circulation pump 44 may be a set of circulation pumps connected as shown in FIG. 6 with some of the pumps designated as duty pumps sized to provide a required or designed recirculation flow and one or more provided as a spare which may alternately be referred to as a standby. In other places, mixed liquor circulates through channels 52. The channels 52, depending on their location and use, may also be called splitter boxes, wells, sumps or other names but, in general terms, enclose a volume of water, which may be mixed liquor, in communication with two or more parts of a treatment plant 10. Passages for mixed liquor flow are provided by a variety of submerged gates 54, surface gates 56 or weirs 58, such as overflow weirs. Where weirs 58 are used at an outlet 16, 36 for multiple tanks 20, 38, the weirs 58 are set to a common elevation. In general, weirs 58 may be replaced with gates or valves of various types connected to control loops that open or close the gate or valve to preserve a generally constant liquid level upstream of the gate or valve similar to what would be provided by an overflow weir, although this will generally be more complicated and may require periodic opening or closure of the gates or valves or other means to collect foam or move it to another part of the plant 10. Permeate is withdrawn through permeate pipes 48 connected to the membrane trains 30. Foam is removed from the treatment plants 10 through foam sumps 50. In FIGS. 1, 3 and 5, foam sumps are shown even though they would not normally be drawn on a cross-sectional representation of the plants 10 cut through processing tank outlets 16. This is done to allow more features to be shown in the Figures, and not to suggest that processing tank outlets 16 outlet from foam sumps 50.

The channels 52 connect the inlets 14, 34 or outlets 16, 36 of plural tanks 20, 38 together. By making this connection, the channels 52 may allow liquid levels or solids concentrations to be equalized between multiple parallel tanks 20, 38. The channels 52 also provide a means for flows to be distributed between tanks 20, 38 without requiring control valves or gates and while minimizing unintended variations in liquid levels between multiple parallel tanks 20, 38. For example, a particular tank 20 or 38 may be isolated from the treatment plant 10 by closing its associated inlet 14 or 34 and outlet 16 or 36. Flow through the channels 52 automatically changes to redistribute the flow that normally passes through the isolated tank 20 or 38 to the other parallel tank or tanks 20 or 38. The channels also enhance layout flexibility of the plants 10 by allowing membrane tanks 38 to be in positions other than directly behind any particular process tank 20, and by allowing the number of membrane tanks 38 to be chosen independently of the number of process tanks 20. In the embodiment of FIGS. 5 and 6, the membrane tanks 38 may also be located away from the process tanks 20, if desired. Alternately, the membrane tanks 38 may be located adjacent to the process tanks 20 or rotated, for example by 90 degrees or 180 degrees, to better fit an available space.

Figure 2:
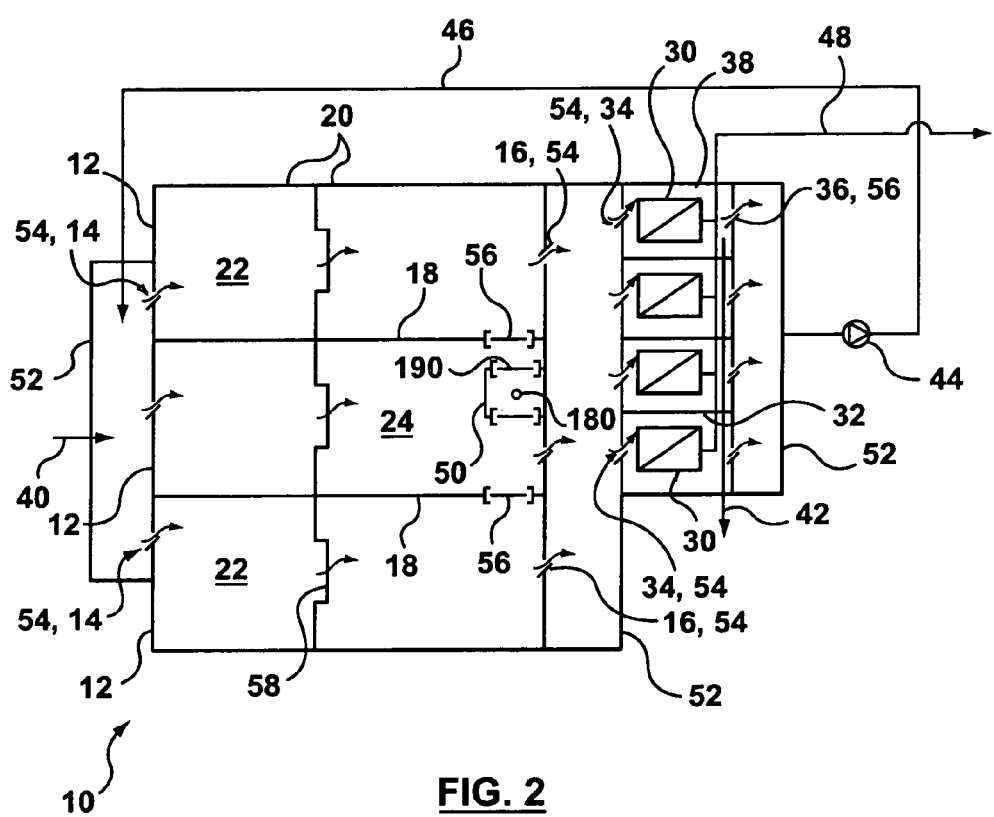
FIG. 2 is a plan view schematic of the plant of FIG. 1.
Figure 4:
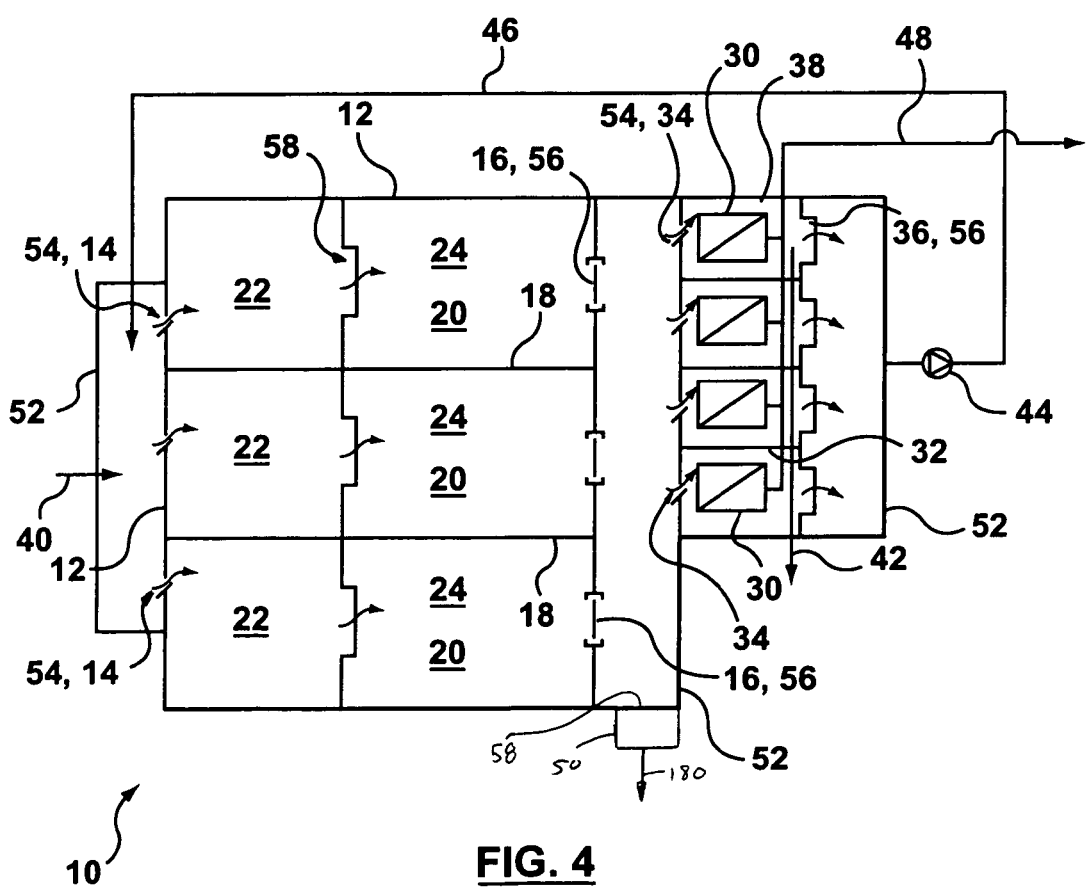
FIG. 4 is a plan view schematic of the plant of FIG. 3.

The channels 52 also allow a number of recirculation pumps 44 to be chosen that is independent of the number of tanks 20, 38 and a single back up or spare recirculation pump 44 may be used for the entire plant 10. The channels 52, in combination with weirs 58 at the membrane tank outlets 36 in some embodiments, also promote a common liquid surface level within the membrane tanks 38. The common liquid surface level, among other things, promotes an even air distribution to membrane trains 30 connected to a common air supply pipe by minimizing variations in liquid head, and liquid head differential, against the aerators. The channels 52 provide volume to help reduce variations in the level of mixed liquor in those parts of the plant 10 intended to vary in depth or allow for a smaller band of level variations required to adapt to changes in feed or processing rates. In the embodiment of FIGS. 3 and 4 in particular, the large channel 52 upstream of the recirculation pump or pumps 44 provides the primary location where water level is varied to account for changes in mixed liquor volume in the plant 10 which allows weirs 58 to be used as membrane tank outlets 36. In comparison with the embodiment of FIGS. 1 and 2, the overflow weirs 58 downstream of the membrane tanks 38 in FIGS. 3 and 4 reduce liquid level variations within the membrane tanks 38, which makes permeate pump and air blower control less complicated in the embodiment of FIGS. 3 and 4. In embodiments with stable liquid elevations in the membrane tanks 38, the control of permeate pumps uses liquid level information or signals from sensors in the area with the most variable level of mixed liquor, this being the last channel 52 upstream of the recirculation pump or pumps 44 in the embodiment of FIGS. 3 and 4, and the last channel 52 upstream of the recirculation pump or pumps 44 or an aerobic zone 24 in the embodiment of FIGS. 5 and 6. In the embodiment of FIGS. 1 and 2, level sensors in the membrane tanks 38 or an adjacent channel 52, preferably an upstream channel 52, may be used to control the rate of permeation or aeration.

The embodiments of FIGS. 1-6 include means for controlling or removing foam from the surface of some or all of the various tanks 20, 38 and channels 52. In the embodiment of FIGS. 1 and 2, foam in the anoxic zones 22 overflows weirs 58 into the aerobic zones 24 of each processing tank 20. A foam sump 50 in one of the processing tanks 20 has a foam gate 190, which operates like a controllable variable position overflow weir. The foam gate 190 may be a variable height surface plate or gate with servos or other actuators for raising or lowering the gate. The foam gate 190 actuator is connected to a level sensor in the aerobic zone 24 surrounding the foam sump 50 or in another part of the plant 10 having a generally similar liquid level. Alternately, the foam gate 190 may be controlled to maintain a liquid level in the sump 50 which may allow a constant speed sump pump to be used. The foam gate 190 is controlled to be raised or lowered in response to liquid level changes to keep the top of the gate just below the level of the adjacent fluid. In this position, foam overflows the foam gate 190 without there being excessive flow of mixed liquid over the foam gate 190 into the sump 50. Foam in the foam sump 50 is removed through a foam drain 180. A foam sump 50 may be provided in each processing train 12 and any other location where foam removal is required. To reduce the number of foam sumps 50, however, the embodiment of FIGS. 1 and 2 uses surface gates 56 between adjacent aerobic zones 24 to transfer foam between processing trains 12. The foam transfer is done periodically by opening the surface gates 56 and stopping aeration in the aerobic zone 24 having the foam sump 50. Stopping aeration drops the liquid level and allows foam to dissipate around the foam sump 50 so that foam from the adjacent processing trains 12 with higher liquid levels may migrate through the surface gates 56 to the foam sump 50. After the foam has migrated, surface gates 56 may be closed and aeration restarted in the aerobic zone 24 having the foam sump 50. If surface gates 56 are not provided between adjacent processing trains 12, foam can be migrated to the foam sump 50 by temporarily closing the processing train outlets 16 of the adjacent processing trans 12 to cause foam to overflow the processing partitions 18, which may have a cutout for this purpose. Stopping aeration in the aerobic zone 24 around the foam sump 50 may assist in the foam transfer. Similarly, foam can be transferred from an upstream zone of a processing train 12 to a downstream zone of the same processing train 12 even if the zones are connected by a submerged gate 54 by temporarily closing the submerged gate 54 until the upstream liquid level rises to the point where foam overflows to the downstream zone.

In FIGS. 3 and 4, foam in the processing trains 12 freely migrates over the weir 58 between the anoxic zones 22 and aerobic zones 24. From the aerobic zones 24, foam freely migrates through the surface gates 56 of the processing train outlets 16 to the channel 52 downstream of the processing tanks 20. Foam in this channel 52 flows to a foam sump 50 at one end of the channel. Foam flows into the foam sump 50 over a weir 58 and out through the foam drain 180. In this way, the channel 52 operates to consolidate the foam for all processing trains 12 to one location. The liquid level in the channel 52 with the foam sump 50 is generally constant because it is moderated or controlled by the weirs 58 at the membrane tank outlets 36. Accordingly, a control loop linked to a level sensor may not be required to constantly vary the position of the weir 58 to the foam sump 50. However, the weir 58 may be controllable, for example to allow it to be adjusted to increase or decrease the rate of foam removal or close completely if required for maintenance or other operations in the plant 10. Optionally, for a long channel 52, one additional foam sump 50 may be provided at the other end of the channels 52, in the middle of the channel 52, or both. Coarse bubble aeration may also be provided in the channel continuously or intermittently to break up the foam or prevent the foam from hardening. Additional foam sumps 50 may be provided at other locations in the plant 10 as desired.

In the embodiment of FIGS. 5 and 6, a foam sump 50 is provided in the channel 52 downstream of the processing tanks 20. As in the embodiment of FIGS. 3 and 4, foam in all of the processing tanks 20 migrates to this single foam sump 50. However, since the liquid level in the channel 52 upstream of the foam sump 50 is variable in this embodiment, a foam gate 190 is provided and connected to a control loop. The control loop includes a level sensor in the adjacent channel 52 or to another part of the plant 10 having a similar liquid level. The foam gate 190 is raised or lowered as required to allow foam to overflow into the foam sump 50 without excessive loss of mixed liquors. Since the inlet to recycle conduit 46 is below the liquid level in the channel 52 adjacent the foam sump 50, foam is not carried to the channel 52 upstream of the membrane tanks 38. Accordingly, this channel 52 remains generally free of foam although a course bubble aerator may be provided to fluidize any foam that is produced or flows into this channel 50. Additional foam is created, however, in the membrane tanks 38. This foam flows over the weir 58 of the membrane tank outlets 36 into a downstream channel 52. A second foam sump 50 may be provided at one end of this channel 52 to collect foam created in the membrane tanks 38 if desired. Alternately, the recycle conduit 46 between the channel 52 downstream of the membrane tanks 38 may be an open gravity flow channel 182, for example, an open trough of rectangular cross section. The open channel 182 allows foam to flow, continuously or intermittently, from the channel 52 downstream of the membrane tanks 38 to the channel 52 upstream of the processing trains 12. Foam in this channel 52 flows through the surface gates 56 of processing train inlets 14 to the processing trains 12. As discussed above, foam in the processing trains 12 collects in the foam sump 50 in the channel 52 downstream of the processing trains 12. In this way, all foam in the plant 10 migrates to a single foam sump 50. If submerged gates 54 are provided in some locations in place of weirs 58 or surface gates 56, foam may be made to circulate through the plant 10 as described above by periodically closing the submerged gates 54 to overflow foam to a downstream area of the plant 10.

FIG. 7 to 10 show details of the membrane trains 30 and equipment attached to the membrane trains 30. In these figures, the membrane train tanks 38 are shown but details of the membrane tank inlets 34 and membranes tank outlets 36 are omitted in FIGS. 7 to 10 since the membrane tanks 38 shown in FIGS. 7 to 10 could be part of the embodiments of any of FIGS. 1 to 6. The membrane trains 30 are each made up of a number of cassettes 60. Each cassette 60 may in turn hold several membrane modules or elements together into a common frame. The module or element is the smallest distinct unit that has a structure for holding multiple membranes and one or more ports for connecting the membranes to a source of suction to withdraw permeate. The module or element may have, for example, between 100 and 1000 square feet of membrane surface area although other sizes may also be used.

The modules or elements in the cassette 60 are connected to a common permeate port for the entire cassette 60, typically through a cassette permeate header and typically without isolation valves between the cassette permeate port and permeate ports for individual modules or elements. Isolation valves are typically included, however, to permit individual cassettes 60 to be separated from pipes connected to other cassettes 60 in a membrane train 30, such as a train permeate header 62, as required for example to remove, repair or test a single cassette 60. These cassette 60 isolation valves are typically not used to control many common functions, such as permeation, and so are not shown in FIGS. 7 to 10. However, a large membrane train 30, or a group of cassettes 60 otherwise provided in a single membrane tank 38, may be subdivided into smaller groups or racks for various purposes either by using multiple train permeate headers 62 or sub-headers, optionally with manual or automatic valves between a train permeate header 62 and any sub-headers.

Figure 7:
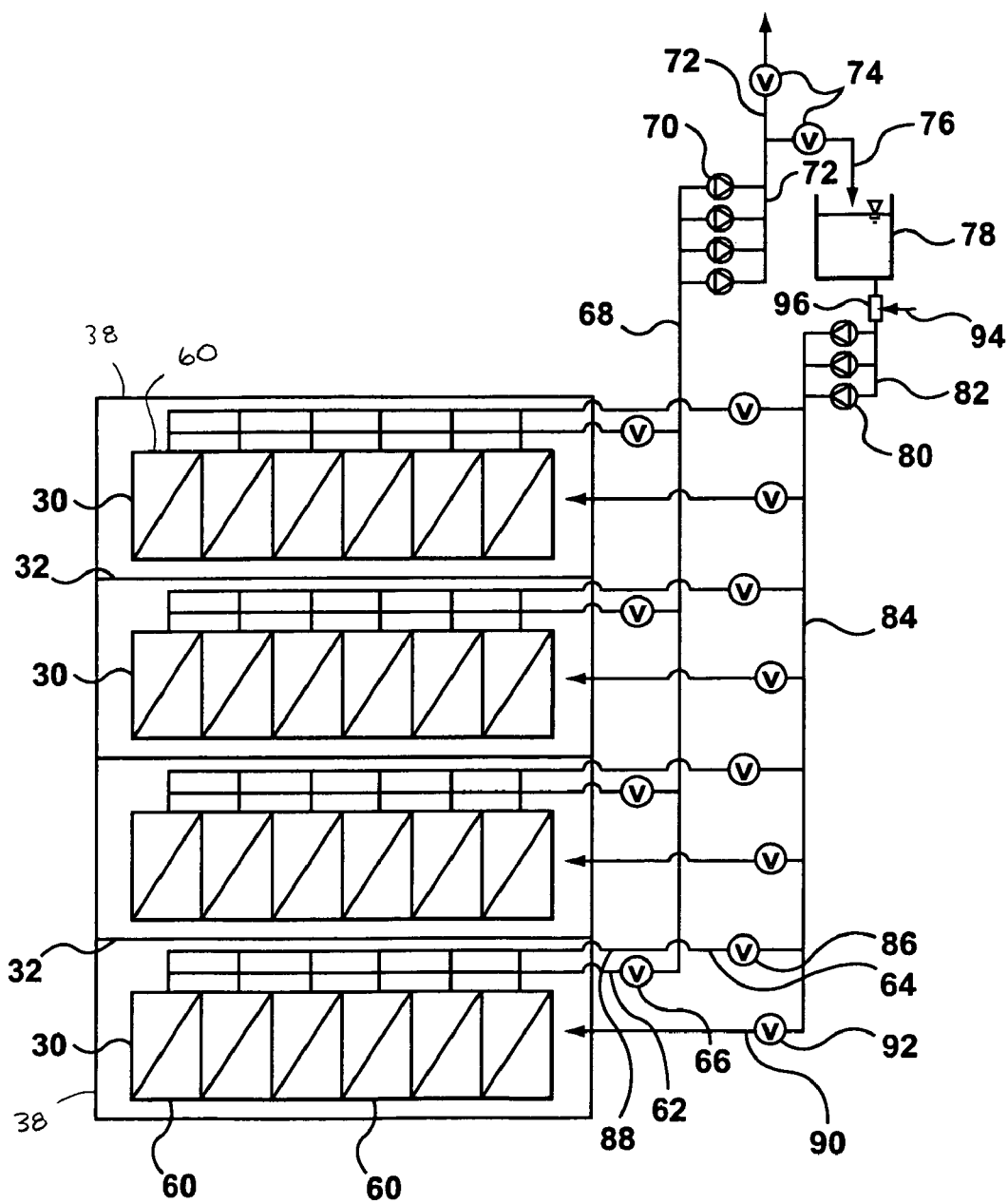
FIG. 7 is a schematic representation of permeate, backwashing, chemical cleaning and permeate tank filling apparatus for a treatment plant.

In FIG. 7, the permeate port of each cassette 60 is attached to a train permeate header 62 and to a train backwash header 64 optionally through sub-headers. The train permeate header 62 of each membrane train 30 is attached through one or more permeate valves 66 to a plant permeate header 68. The plant permeate header 68 is in turn connected to a set of plural permeate pumps 70 each connected by their inlets or a suction line to the plant permeate header 68 and by their outlets or a discharge line to a permeate outlet pipe 72. One of the permeate pumps 70 may be operated as a spare to be used if one of the other permeate pumps 70 breaks. Accordingly, in the embodiment illustrated, the three non-spare or duty permeate pumps 70 are sized for the maximum flow from the four membrane trains 30. The amount of permeate produced may be controlled by altering the speed of some or all of the non-spare permeate pumps 70, by turning on or off one or more of the non-spare permeate pumps 70, by closing, opening or throttling one or more of the permeate valves 66, or by a combination of these techniques. The permeate production of an individual membrane train 30 may be controlled by using flow control valves rather than simple isolation valves for the permeate valves 66 and operating the permeate valve 66 of one or more membranes trains 30 to restrict flow of permeate from one membrane train 30 relative to another membrane train 30. In cases where flow control valves are used, flow meters are also generally used, although not shown or specifically described. By operating permeate diversion valves 74, permeate outlet pipe 72 may be connected to a backwash tank inlet 76 to fill a backwash tank 78. Diversion valves 74 may be connected to a level sensor in backwash tank 78 and automatically controlled to divert permeate as required to keep backwash tank 78 filled above a set minimum level or volume and below a set maximum level or volume.

To backwash the cassettes 60, a set of backwash pumps 80, one of which may be operated as a spare, are connected between a backwash tank outlet pipe 82 and a plant backwash manifold 84. The plant backwash manifold 84 is connected through backwash valves 86 to a train backwash header 88 for each membrane train 30. The train backwash headers 88 are in turn connected to the permeate port of each cassette 60. Alternately, the train permeate headers 62 may be also connected to the plant backwash manifold 84 with appropriate valves, for example isolation valves in pipes running from the plant backwash manifold 84 to join each train permeate header 62 upstream of the permeate valves 66, to allow the train permeate headers 62 to intermittently operate as backwash headers. The plant backwash manifold 84 may also be connected to a permeate fill pipe 90 connected through a permeate fill valve 92 associated with each membrane tank 38. Backwashing is typically performed on one membrane train 30, or a smaller set of cassettes 60, at a time by closing the permeate valve 66 associated with the set of cassettes 60, opening the associated backwash valves 86, and operating backwash pumps 80 which may cause diversion valves 74 to divert permeate to backwash tank 78. The number and size of backwash pumps 80 may be chosen for a single membrane train 30, or smaller set of cassettes 60, although backwash pumps 80 service all cassettes 60 in the plant 10 in turn.

For maintenance cleaning, or other times when a backwash with a chemical solution is desired, chemicals may be introduced into the permeate used for backwashing through a chemical inlet 94 to an optional in-line mixer 96 in the backwash tank outlet pipe 82 or another location in the backwash piping such as on the discharge side of backwash pumps 80. During maintenance cleaning, or at other times when a chemical backwash will be supplied to cassettes 60 in one membrane tank 38, that tank may be isolated from the rest of the plant 10 by closing all associated permeate valves 60, and the associated membrane tank inlet 34 and membrane tank outlet 36, although the isolated membrane tank 38 may remain filled. The backwash with cleaning chemicals may be performed in a series of short periods of flow, for example of between 30 seconds and 5 minutes, separated by waiting or relaxation periods of, for example, 1 minute to 20 minutes. For recovery cleaning, or at other times when an empty membrane tank 38 is desired, an isolated membrane tank 38 may be drained using the apparatus described in relation to FIG. 10 below. The recovery cleaning regimen may involve backwashing a set of cassettes 60, for example a membrane train 30, with permeate mixed with cleaning chemical, as described for maintenance cleaning but with the membrane tank 38 initially empty, until the membrane tank 38 is partially filled. The membrane tank 38 may then be filled to cover the cassettes 60 through permeate fill pipes 90 which may have more cleaning chemical mixed into it. The cassettes 60 are then allowed to soak for an extended period of time, for example between 15 minutes and 6 or 24 hours. The isolated membrane tank 38 is then drained and returned to service. The liquid drained out of the isolated membrane tank 38, which may include unreacted cleaning chemicals, may be neutralized and then wasted, returned to a channel 52 upstream of the processing tanks 20 or another upstream part of the plant 10, distributed to other membrane tanks 38 for re-use or sent for other treatment. If the liquid drained from one membrane tank 38 will be re-used in cleaning a subsequent membrane tank 38, additional chemical may be added either in the subsequent membrane tank 38 or in an intervening cleaning solution storage tank.

Figure 8:
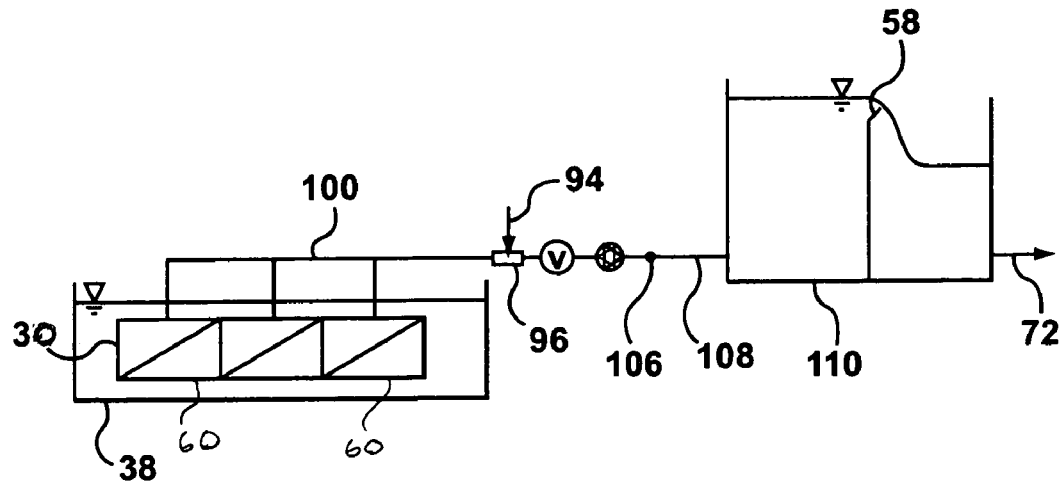
FIG. 8 is a schematic representation of permeate, backwashing, chemical cleaning and permeate tank filling apparatus for another treatment plant.
Figure 9:
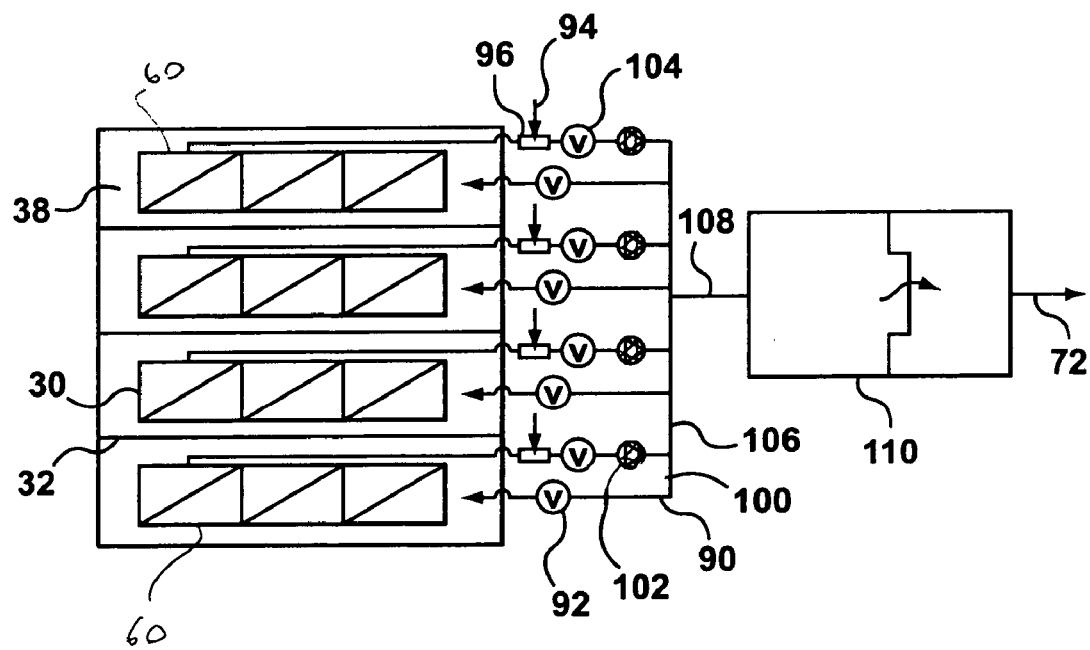
FIG. 9 is another schematic representation of the apparatus of FIG. 8.

FIGS. 8 and 9 show an alternate means of providing permeation and backwashing. The cassettes 60 of each membrane train 30 are connected to a permeate/backwash header 100 having an in-line reversible pump 102 and flow control valve 104, although the flow control valve 104 may be replaced by a simple valve, such as an isolation valve, if a variable speed reversible pump 102 is used. The permeate/backwash headers 100 are connected to a plant permeate/backwash header 106 connected to a holding tank inlet 108 leading to a holding tank 110. The holding tank 110 is configured to fill itself to a maximum volume before releasing permeate, or all permeate flow, to a permeate outlet pipe 72. In the embodiment illustrated, this configuration is achieved through the use of a weir 58, although the weir 58 may be omitted if permeate outlet pipe 72 is connected to a point near the top of holding tank 110. Alternately, as in other locations in the plant 10 where a weir 58 is used, a submerged gate 54 or surface gate 56 may be used in place of a weir 58 if linked to a level sensor and control device to control flow out of or into the retaining tank 110 so as to keep the level of liquid in the holding tank 110 within a suitable range. For example, plant permeate/backwash header 106 may connect directly to permeate outlet pipe 72 but with a valved T-connection allowing some permeate to be diverted to, or flow back from, holding tank 110. In all cases described above, the volume of the plant permeate/backwash header 106 and holding tank inlet 108 may be made large and considered as part of the holding tank volume 110 to reduce the size of or eliminate holding tank 110 which may also retain a larger volume of permeate closer to the cassettes 60.

To produce permeate, reversible pumps 102 are operated in a forward direction to flow permeate to the holding tank 110. Holding tank 110 is kept above a minimum level or pressure so that plant permeate/backwash header 106 is always full of permeate. To backwash a selected set of cassettes, the reversible pump 102 associated with that set of cassettes is reversed so that it draws permeate from the plant permeate/backwash header 106 and flows the permeate back through the set of cassettes. Depending on the size of plant permeate/backwash header 106 and the rate of flow of permeate from non-selected cassettes 60, permeate may or may not also be drawn from holding tank 110. With a large plant permeate/backwash header 106 and adequate control mechanisms to ensure that plant permeate/backwash header 106 is always flooded, holding tank 110 may be omitted. Alternately, holding tank 110 may be configured as a channel 52 directly connected to permeate/backwash headers 100 and plant permeate/backwash header 106 and holding tank inlet 108 omitted. In plants 10 having a storage tank for storing water for later distribution or use, this storage tank may also take the place of holding tank 110. Chemical inlets 94 and optional in-line mixers 96 are provided in the embodiment of FIGS. 8 and 9 and used in a manner similar to that described for the embodiment of FIG. 7 to provide maintenance cleaning or recovery cleaning to an isolated membrane tank 38. Permeate fill pipes 90 and permeate fill valves 92 are also provided to allow a selected membrane tank 38 to be filled with permeate. Permeate fill pipes 90 may alternately be connected directly to holding tank 110, to a channel 52 replacing holding tank 110, to permeate/backwash headers 100 if the reversible pumps 102 are flow through pumps or if permeate/backwash headers have a by-pass loop around the reversible pumps 102. In the option last mentioned above, the permeate fill pipes 90 may optionally be connected to the permeate/backwash headers 100 between the cassettes 60 and the chemical inlets 94 or in-line mixers 96 to allow chemicals to be mixed with permeate used to fill a membrane tank 38 if desired.

Figure 10:
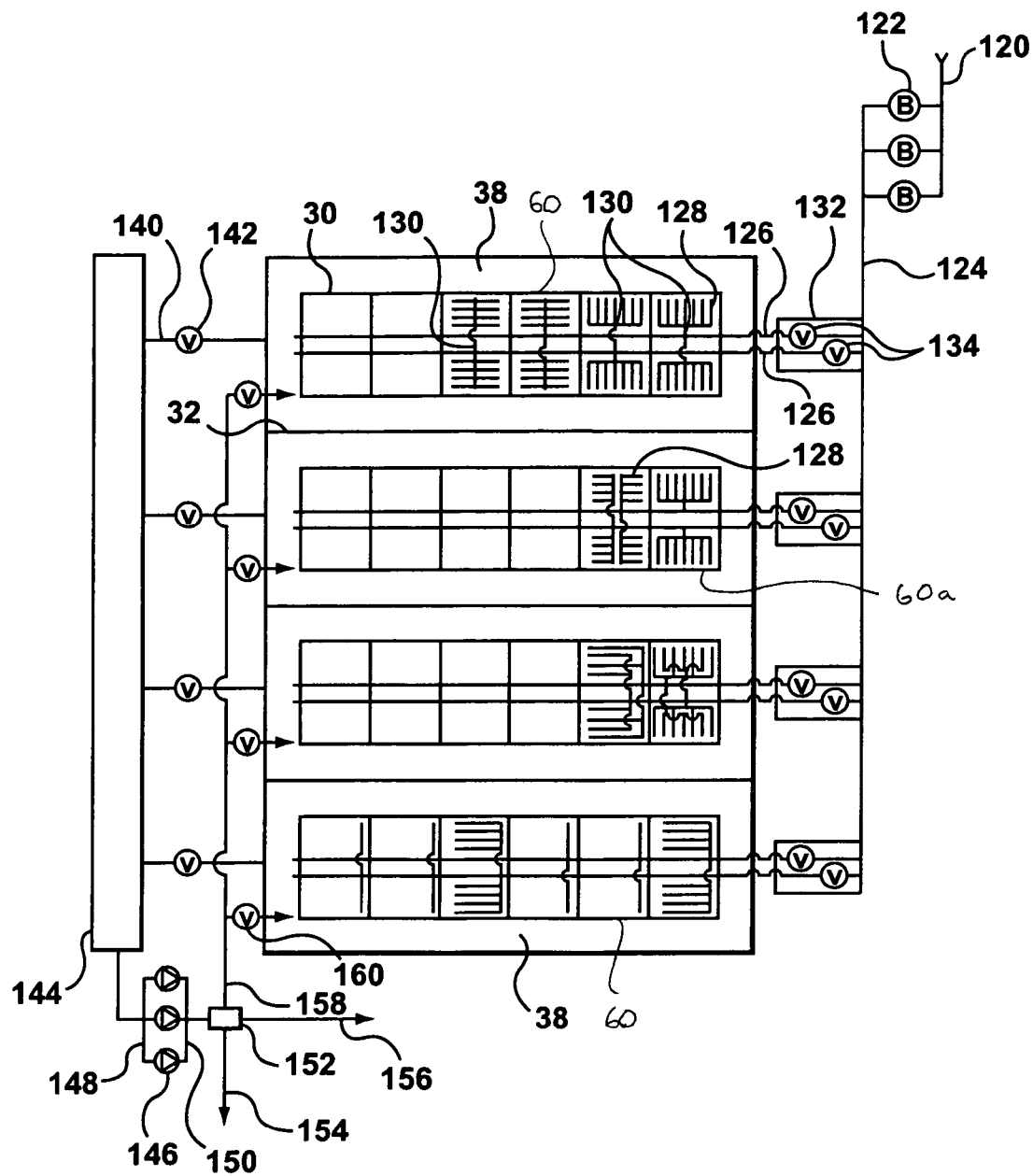
FIG. 10 is a plan view schematic of aeration, tank draining and sludge circulation apparatus of a treatment plant.

FIG. 10 shows a means for aerating the cassettes 60. An optional air inlet 120 draws air from the atmosphere generally into the plant 10. A set of blowers 122 each have their inlets connected to the air inlet, or to the atmosphere generally, and their outlets each connected to a plant air manifold 124. The number and size of blowers 122 is chosen to be able to supply air to all cassettes 60, optionally with one or more blowers 122 operating as a spare or standby. The blowers 122 may be controlled by a PLC or operator that receives information regarding the number of membrane trains 30 that are in production, and optionally other data such as their rate of production or TMP, and turns on a number of blowers 122 at a speed sufficient to supply air to the membrane trains 30 in production. The plant air manifold 124 is connected to a pair of train air manifolds 126 associated with each membrane train 30. The train air manifolds 126 are connected to individual aerators 128, typically through one or more intermediate pipes 130 that connect individual aerators 128 to one of a pair of common air inlets of the cassette 60. Each air inlet is connected to one of the train air manifolds 126. The aerators 128 are located so as to provide a source for bubbles that rise through the cassettes 60 and may be connected to the frame of the cassette 60, wholly or partially integral with the modules or elements, or free standing on the floor of the membrane tanks 38.

The connection between the plant air manifold 124 and the train air manifolds 126 is made through a cyclic valve set 132. The cyclic valve sets 132, with their associated controllers, may be operated to provide a higher rate of air flow in one of the train air manifolds 126 of a pair and a lower rate of air flow, ranging from no flow to one half of the higher rate of air flow, in the other of the train air manifolds 126 of a pair, and to switch which train air manifold 126 of a pair receives the higher air flow in repeated cycles, typically between 15 seconds and 120 seconds in duration, the duration of a cycle being the total time from when air at the higher rate is first supplied to a train air manifold 126 in one cycle until when air at the higher rate is first supplied to the same train air manifold 126 in a subsequent cycle. The cyclic valve sets 132 may comprise a pair of pneumatically activated butterfly valves capable of either opening or closing in about 1 or 2 minutes. It is not necessary that the valves close to an air tight seal, a flow of up to 10% of the higher flow rate through a closed valve being acceptable. Suitable cyclic valve sets 132 and controllers are described in U.S. Pat. No. 6,550,747 issued Apr. 22, 2003 to Rabie et al and incorporated herein in its entirety by this reference to it. The cyclic valve sets 132 may also be operated to shut off flow to both train air manifolds 126 of a pair simultaneously to allow a membrane train 30 to be isolated from air flow, or separate isolation valves may be provided for the same purpose. When flow to a membrane train 30 is shut off, the speed of the blowers 122 may be reduced, the flow of air through one or more blowers 30 may be throttled, or one or more of the blowers 122 may be shut off, or a combination of these methods, to avoid supplying the operating or non-isolated membrane trains 30 with an excess of air. Valve opening and closing times may be staggered across the cyclic valve sets 132 to reduce pressure spikes in the plant air manifold 124. For example, where each cyclic valve set 132 includes two air valves 134 as in the embodiment shown, one valve 134 of each cyclic valve set may open for about 10 seconds and close for about ten seconds to produce a 20 second cycle, but the opening times of all eight air valves 34 is staggered such that one air valve 134 begins opening and one air valve 134 begins closing about every 2.5 seconds, optionally as adjusted to provide an overlap in the opening and closing of air valves 134 in a cyclic valves set 132 as described in U.S. Pat. No. 6,550,747.

As shown in FIG. 10, the intermediate air pipes 130 may be connected to the aerators 128 and train air manifolds 126 in various ways. Each cassette 60, or set of cassettes 60, shown represents an alternate arrangement which may each be used throughout all of the membrane tanks 38. According to these various alternate arrangements, the air flow may cycle, for example, between interspersed sets of aerators 128 under a single cassette 60, between aerators 128 under opposite sides of a cassette 60, between aerators 128 in different halves of a membrane tank 38, to aerators 128 under different cassettes 60 within a membrane tank 38, or to various combinations of the above. For more particular example, all aerators 128 in each membrane tank 38 may be connected as shown under cassette 60*a* to the extreme right hand side of the second membrane tank 38 from the top in FIG. 10. In this way, the air valves 134 may be operated to provide the higher air flow cyclically to one half of each cassette 60, and simultaneously to one half of each membrane tank 38, the membrane tank 38 being divided along a line through the middle of the membrane tank 38 parallel to the train air manifold 126, for a portion of each cycle and then switch the higher flow to the other halves of the cassettes 60 in the same membrane tank 38 or to a half of the cassettes 60 in another membrane tank 38. For example, at times when operating conditions promote rapid fouling, the higher air flow can be cycled back and forth between the two halves of a membrane tank 38. If or when operating conditions are less likely to promote rapid fouling, for example in water filtration under gentle conditions, the total air supply can be reduced and the air valve 134 can be operated to provide air at the higher flow rate to each half of each membrane tank 38 for between one half and one sixth of each cycle by switching the higher flow between up to six membrane tanks 38, or halves of the membrane tanks 38, in turn, for example for 10 seconds each in a cycle between 20 and 60 seconds long.

FIG. 10 also shows a means for draining individual membrane tanks 38. In addition to the membrane tank outlets 36, each membrane tank 38 also has a tank drain line 140 running from the near the bottom of the membrane tank 38 through a drain valve 142 to a drainage channel 144. Tank drain line 140 may alternately be configured for gravity flow. Tank drain lines 140 may be deleted by placing drainage channel 144 directly adjacent to ends of the membrane tanks 38, optionally such that the drainage channel 144 shares a wall with the membrane tanks 38. In this case, any channel 52 for recirculating flows of mixed liquor on one end of the membrane tanks 38 may be made shallower and located above the drainage channel 144. If desired, drainage channel 144 may be replaced by a more remote drainage tank or omitted, although omitting the drainage channel 144 without providing a drainage tank will complicate drainage control. Optionally, a set of drainage pumps 146, one of which may be a spare or standby, are connected by their inlets to drainage manifold 148, which may be connected directly to the drainage channel 144 or directly to the tank drain lines 140. The outlets of the drainage pumps 146 are connected to a drainage header 150 that is connected to a drainage junction box 152. From drainage junction box 152, drained liquids may be sent through a digester line 154 to a digester or other type of sludge processor, to a sludge recirculation line 156 to be inlet back into the plant 10 at another location, or to a re-fill line 158 from where, by selectively opening or closing one or more re-fill valves 160, the drained fluids may be flowed into one or more of the membrane tanks 38. Each membrane tank 38 may be drained individually by closing its associated membrane tank inlet 34 and membrane tank outlet 36 and opening its associated drain valve 142. Sludge may also be wasted from one or more membrane tanks 38, either individually or some or all at a time, and either in batch or continuously, by operating the relevant drain valves 142. Drainage pumps 146 are operated as required to keep the level of sludge in drainage channel 144 within acceptable limits or to meet demand for sludge in other parts of the plant 10. Cleaning solution drained from one membrane tank 38 may also flow to drainage junction box 152 and from there may be transferred through re-fill line 158 to another membrane tank 38, sent to another part of plant 10 such as the head of the processing trains 12 or to a chemical solution storage tank (not shown) which may be connected in turn to re-fill line 158.

The apparatus in FIG. 10 may also be used to thicken sludge at times when all membrane trains 38 are not required at their maximum permeate production capacity. For example, in a plant with high load peaking factors and three or more membrane trains 38, one membrane train 38 may not be required at a recurring particular time, for example, in the middle of the night, or at other times having average or less feed flow. At these times, one of the membrane trains 38, which might otherwise be put into a standby mode, is used to thicken sludge. If flow demand increases unexpectedly during these times, or mechanical problems prevent one of the other membrane trains 38 from meeting the required rate of permeate production, the sludge thickening process can be aborted and the selected membrane train 38 returned to normal operation.

While thickening a batch of sludge in a selected membrane tank 38, drain valves 142 from the non-selected membrane tanks 38 may be partially opened to continuously or intermittently admit sludge into the drainage channel 144 and so maintain a bleed of sludge from the non-selected membrane tanks 38, or drain valves 142 from the non-selected membrane tanks 38 may be closed so that sludge bleeding from the non-selected membrane tanks 38 occurs only indirectly through the selected membrane tank 38 during those times. Filtration and mixed liquor recirculation may continue in the non-selected membrane tanks 38. To thicken sludge by a batch or dead end process, the drain valve 142 to the selected membrane tank 38 is closed. Permeation continues through the cassettes 60 in the selected membrane tank 38, although the rate of permeation may be reduced. Liquid removed from the selected membrane tank 38 through permeation may be replaced by mixed liquor flowing as in normal operation in through the membrane tank inlet 34, sludge from the non-selected membrane tanks 38 pumped from the drainage channel 144 through the re-fill line 158 to the selected membrane tank 38, mixed liquor flowing in through the membrane tank outlet 36 or a mix of one or more of these. If either or both of the selected membrane tank inlet 34 or selected membrane tank outlet 36 are not required to allow mixed liquor to enter the selected membrane tank 38, they are closed. Liquid replacement may be continuous or in batches, but with the liquid level in the selected membrane tank 38 kept above the cassettes 60. When the concentration of solids in the selected membrane tank 38 has increased to at least a desired concentration, for example about 30,000 mg/L, the concentrated sludge is drained from the selected membrane tank 38. This is done by closing the drain valves 142 to the non-selected membrane tanks 38, if they are open, while opening the drain valve 142 to the selected membrane tank 38. Thickened sludge flows into the drainage channel 144 from where it is pumped to the digester or solids handling line 154 which is connected to a digester tank or other sludge treatment or disposal apparatus. After the selected membrane tank 38 is drained, drain valves 142 to the non-selected membrane tanks 38 may be re-opened, if a sludge bleed will be returned to the non-selected membrane tanks 38, preferably after the selected membrane tank 38 has been refilled, for example through its membrane tank inlet 34. While the liquid level in the selected membrane tank 38 is below the cassettes 30, permeation, and optionally aeration, are stopped in that membrane tank 38. The selected membrane tank 38 may be used to thicken another batch of sludge or returned to ordinary operation. The membrane tanks 38 may be each selected for sludge thickening in turn, such that each is used for about the same number of sludge thickening cycles over a long period of time.

A selected membrane tank 38 may also be used to thicken sludge in a feed and bleed or continuous process. For this, drain valve 142 to the selected membrane tank 38 is opened while drain valves 142 to the non-selected membrane tanks 38 are closed or drain vale 142 to the selected membrane tank 38 is open so as to allow less mixed liquor flow than from the non-selected membrane tanks 38. Membrane tank inlets 34 and outlets 36 to the non-selected membrane tank 38 may remain open. Membrane tank outlet 36 to the selected membrane tank 38 is also opened. If the membrane tank outlet 36 to the selected membrane tank 38 is a weir 58 or surface gate 56, it is lowered, if necessary, so that liquid in a channel 52 downstream of the membrane tank 38 may flow into the selected membrane tank 38. In this way, a portion of liquid from the membrane tank outlets 36 of the non-selected membrane tanks 38 flows to the selected membrane tank 38 for further thickening. Optionally, the membrane tank inlet 34 to the selected membrane tank 38 may be open and its membrane tank outlet 36 closed so that mixed liquor enters the selected membrane tank 38 through its membrane tank inlet 36. Thickened sludge is extracted from the selected membrane tank 38 through the draining channel 144. In either batch (dead end) or continuous (feed and bleed) operation, the cassettes 60 in the selected membrane tank 38 may be aerated more heavily or have a lower rate of permeation than other cassettes 60. By either method, a flow of waste sludge from the plant as a whole is provided through the selected membrane train 38. The selection of a membrane train 38 for sludge thickening may be rotated through the set of membrane trains 38 so that all membrane trains 38 of the set experience similar conditions when averaged over long periods of time.

Numerous other modifications may also be made within the scope of the invention.

We claim:

1. A process for operating a water treatment plant comprising the steps of:
    (a) providing one or more process tanks containing water to be treated,
    (b) providing two or more trains of cassettes of membrane modules, each of the two or more trains being located in a separate membrane tank,
    (c) during a first period of time, operating each of the two or more trains in parallel, wherein the membrane tanks housing each of the two or more trains receive water in parallel from the one or more process tanks, the two or more trains are operated to remove permeate from the received water and mixed liquor is transferred from the membrane tanks housing each of the two or more trains to the one or more process tanks, and
    (d) during a second period of time, selecting one of the two or more trains, transferring sludge from the membrane tank housing a non-selected train to the membrane tank housing the selected train, and operating the selected train to thicken the transferred sludge, while the membrane tank or membrane tanks housing the non-selected train or trains continue to receive water from the one or more process tanks and the non-selected train or trains are operated to remove permeate from the received water and mixed liquor continues to be transferred from the membrane tank housing the non-selected train to the one or more process tanks.

2. The process of claim 1, wherein step (d) comprises closing any outlets from the membrane tank housing the selected membrane train and operating the selected membrane train in a dead end mode.

3. The process of claim 2, wherein during step (d), sludge from the membrane tank housing the non-selected train is admitted into a drainage channel, and liquid removed through permeation from the membrane tank housing the selected membrane train is replaced by sludge from the membrane tank housing the non-selected train pumped from the drainage channel to the membrane tank housing the selected membrane train.

4. The process of claim 2, wherein each membrane tank has a membrane tank outlet, during step (c) sludge is removed from each of the membrane tanks through the respective membrane tank outlets, and during step (d) permeate removed from the membrane tank housing the selected membrane train is replaced by sludge flowing in through the membrane tank outlet of the membrane tank housing the selected train.

5. The process of claim 1, wherein step (d) comprises operating the selected train in a continuous mode by removing thickened sludge from the membrane tank housing the selected membrane train while operating the selected membrane train to remove permeate.

* * * * *